United States Patent Office 3,121,072
Patented Feb. 11, 1964

3,121,072
OXYTOCIN CITRATE
Harry M. Crooks, Jr., Grosse Pointe, Mich., assignor to Parke, Davis & Company, Detroit, Mich., a corporation of Michigan
No Drawing. Filed Jan. 15, 1958, Ser. No. 708,984
1 Claim. (Cl. 260—112)

The present invention relates to novel salts of oxytocin, and more particularly to salts of oxytocin and non-toxic polycarboxylic acids.

It is an object of this invention to provide chemical derivatives of oxytocin which exhibit the high stability and high activity needed for the most efficient and versatile utilization of oxytocic agents.

It is a further object of this invention to provide pharmaceutically-acceptable salts of oxytocin which can be readily isolated in the solid state and which retain high activity in the solid state under adverse conditions of storage and use.

It is a further object of this invention to provide dosage forms of oxytocin salts which are useful for sublingual or buccal administration, whereby the oxytocic effect is realized following absorption through the mucosa, without the need for administration by injection.

These and other objects of this invention are achieved by the formation of salts of oxytocin with non-volatile, non-toxic organic acids. Especially suitable for this purpose are the non-toxic polycarboxylic acids. Representative of this class of compounds are hydrocarbon polycarboxylic acids such as succinic, maleic, glutaric, citraconic, and glutaconic acids; hydroxyhydrocarbon polycarboxylic acids such as malic, tartaric and citric acids; aminohydrocarbon polycarboxylic acids such as aspartic and glutamic acids; and other functionally-substituted polycarboxylic acids. While it is provided by this disclosure that the polycarboxylic acids employed in the salt formation shall be non-toxic, this term is to be qualified by the recognition that the salts of this invention are biologically active in extremely low dosage [as is oxytocin itself] and that consequently an organic acid which is moderately toxic in larger amounts is actually a non-toxic material in the quantities in which it is administered in the compositions of this invention.

Substances suitable as starting materials in the manufacture of the salts of this invention are oxytocin [α-hypophamine] isolated from the pituitary glands of slaughtered animals, or a synthetic product prepared by polypeptide synthesis. Oxytocin accepted for use in clinical medicine is regularly a fractionated glandular extract of reproducible biological activity, and is not a chemically-pure compound. Likewise it is satisfactory to manufacture and use the salts of this invention in an incompletely purified form, following standardization by bioassay. The degree of chemical purity of the salt obtained by any of the procedures herein described is directly related to the purity of the oxytocin used as a starting material, and the methods described afford pure salts when pure oxytocin is employed.

In the preparation of either natural or synthetic oxytocin, it is regularly obtained in an aqueous solution containing acetic acid and mineral salts. Upon evaporation of such a solution to dryness, the acetic acid volatilizes and the pH of the solution approaches the basic side of neutrality, under which conditions the oxytocin undergoes gradual decomposition.

Accordingly, this invention affords a method for the extraction of oxytocin from such solutions and the preparation of stable, pharmaceutically-acceptable salts which may thereafter be employed for sublingual or buccal administration.

The first step of this process comprises the extraction of the aqueous solution of crude or purified oxytocin with a solvent mixture containing a phenolic compound and a chlorinated hydrocarbon. Suitable for this purpose are phenolic compounds such as phenol, a cresol, or a xylenol; and a chlorinated solvent such as chloroform, methylene chloride, or ethylene dichloride. In the second step, the organic solvent mixture is diluted with from 1 to 10 volumes of an aliphatic ether, petroleum ether, or a mixture of these solvents, and extracted with water, whereupon the oxytocin passes in the aqueous phase. Small quantities of phenol are removed from the aqueous phase by extraction with ether or a hydrocarbon solvent, and the remaining solution is treated with approximately one molecular equivalent of the selected acid.

The solution is then brought to dryness by such means as drying it in a vacuum in the frozen state. The residue obtained is the desired salt which, unlike oxytocin and salts of oxytocin with volatile acids, exhibits a high degree of stability. Alternatively, the aqueous solution of oxytocin remaining after the extraction procedure can be concentrated to dryness, rapidly titrated with approximately one molecular equivalent of the selected acid to a pH of about 3.5–4.5 and again dried.

For the pharmaceutical utilization of a salt thus obtained, an aqueous solution can be reconstituted by dissolving it in water. The aqueous solution can be standardized and absorbed on paper discs. Such discs, after drying, are a suitable form for sublingual administration. Alternatively, lozenges or wafers for sublingual use, and comprising a carrier such as lactose or glucose, can be prepared by adding the aqueous solution or the solid salt to the mix from which the lozenge or wafer is prepared.

An additional advantage of the polycarboxylic acid salts of this invention is that they have the general characteristic of high water solubility and are rapidly-acting following administration. This behavior is in contrast to insoluble salts of oxytocin which are of value, if at all, only as repository forms for those applications in which delayed action is desired.

Salts of oxytocin with non-toxic, non-volatile mineral acids such as sulfuric acid and phosphoric acid can also be prepared, by careful titration of oxytocin powder or aqueous solution to a pH of about 4 with the selected dilute mineral acid. Such preparations are relatively somewhat less stable than the organic acid salts specifically described, because of the greater tendency for hydrolysis of peptide linkages in the presence of mineral acid.

This invention will appear more fully from the following examples, which are set forth by way of illustration only. Many modifications in materials and methods will be apparent from this disclosure to those skilled in the art.

Example 1

A 133 ml. sample of α-hypophamine concentrate assaying 250 oxytocic and 3 pressor units per ml. is extracted with a total of 40 ml. of a phenol-chloroform mixture in four equal portions. The solvent mixture employed is prepared in the proportion of four parts by weight of phenol to three parts by weight of chloroform. The combined extract is washed with 4 ml. of distilled water and then diluted with 100 ml. of ether. The ethereal solution is extracted with a total of 30 ml. of distilled water in six equal portions and the combined aqueous extract [which contains the desired fraction] is washed three times with 10 ml. portions of ether, partially decolorized with activated charcoal and filtered. To the filtrate is added 20 mg. of hydrated citric acid, and the solution is lyophilized. The residual product obtained as a powder is oxytocin citrate of high biological activity. Reconstitution of an aqueous solution by dissolving this product in water affords a solution having a pH of about 3.6.

The stability of this preparation of oxytocin citrate under adverse storage conditions can be demonstrated by impregnating a filter paper disc with the reconstituted solution and measuring the retention of activity after a period of time. By this method, it is shown that filter paper discs made to contain 10 units of oxytocin activity per disc retain at least 90% of this activity after storage for 500 hours at 45° C.

*Example 2*

A 53 ml. portion of a solution of oxytocin assaying 230 oxytocic units per milliliter is extracted five times with 5 ml. portions of a solution containing equal parts by volume of phenol and chloroform. The combined phenol-chloroform extract is washed twice with 2 ml. portions of water and then partitioned by mixing it with 50 ml. of ether, 50 ml. of heptane and 5 ml. of water. The aqueous phase is preserved and combined with two additional 5 ml. aqueous extracts of the ethereal solution. This combined aqueous extract [which contains the desired fraction] is washed twice with 15 ml. portions of ether, freed of traces of ether by shaking it under reduced pressure, and treated with 3 ml. of an aqueous solution containing 1.5 mg. of succinic acid per ml. The solution is shell-frozen and dried from the frozen state to give 47.5 mg. of a friable, non-hygroscopic, electrically-charged powder. This product is oxytocin succinate assaying 216 oxytocic units per mg. Reconstitution of an aqueous solution by dissolving this product in 10 ml. of distilled water affords a solution having a pH of about 4.2.

*Example 3*

A 51 ml. portion of a solution of oxytocin assaying 230 oxytocic units per milliliter is extracted five times with 5 ml. portions of a solution containing equal parts by volume of phenol and chloroform. The combined organic solvent extract is washed twice with 2 ml. portions of water, which are discarded. There is then added 100 ml. of a mixture prepared from equal volumes of ether and petroleum ether, and the resulting solution is extracted three times with 5 ml. portions of water. The combined aqueous extract [which contains the desired fraction] is washed twice with 15 ml. portions of ether, freed of traces of ether under vacuum, and treated with 2.9 ml. of a solution containing 1.4 mg. per ml. of $l$-malic acid in distilled water. The solution is lyophilized to afford about 48 mg. of a preparation of oxytocin $l$-malate which shows a biological assay of 220 oxytocic units per mg. Reconstitution of a solution by dissolving this product in 10 ml. of distilled water results in an aqueous solution having a pH of about 4.15.

*Example 4*

A 50 ml. portion of a solution of oxytocin assaying 230 oxytocic units per milliliter is extracted with a total of 25 ml. in five equal portions of a solution containing equal parts by volume of phenol and chloroform. The combined extract is washed twice with 2 ml. portions of water, which are discarded, and then diluted with 50 ml. of ether and 50 ml. of heptane. The solution is extracted three times with 5 ml. portions of water and the combined aqueous extract [which contains the desired fraction] is washed twice with 15 ml. portions of ether and then shaken under reduced pressure in order to complete the removal of ether from the aqueous phase. To the remaining aqueous solution is added 3 ml. of an aqueous solution containing 2 mg. of glutamic acid per ml. The solution is shell-frozen and dried under vacuum in this state to afford 42 milligrams of a preparation of oxytocin glutamate. When dissolved in 10 ml. of distilled water, the solution so reconstituted has a pH of about 4.4.

What is claimed is:
Oxytocin citrate.

References Cited in the file of this patent
UNITED STATES PATENTS
2,802,865     L'Italien _____ Aug. 13, 1957
OTHER REFERENCES
Du Vigneaud: J. Am. Chem. Soc., vol. 75 (1953), p. 4879–80.